Patented Oct. 23, 1934

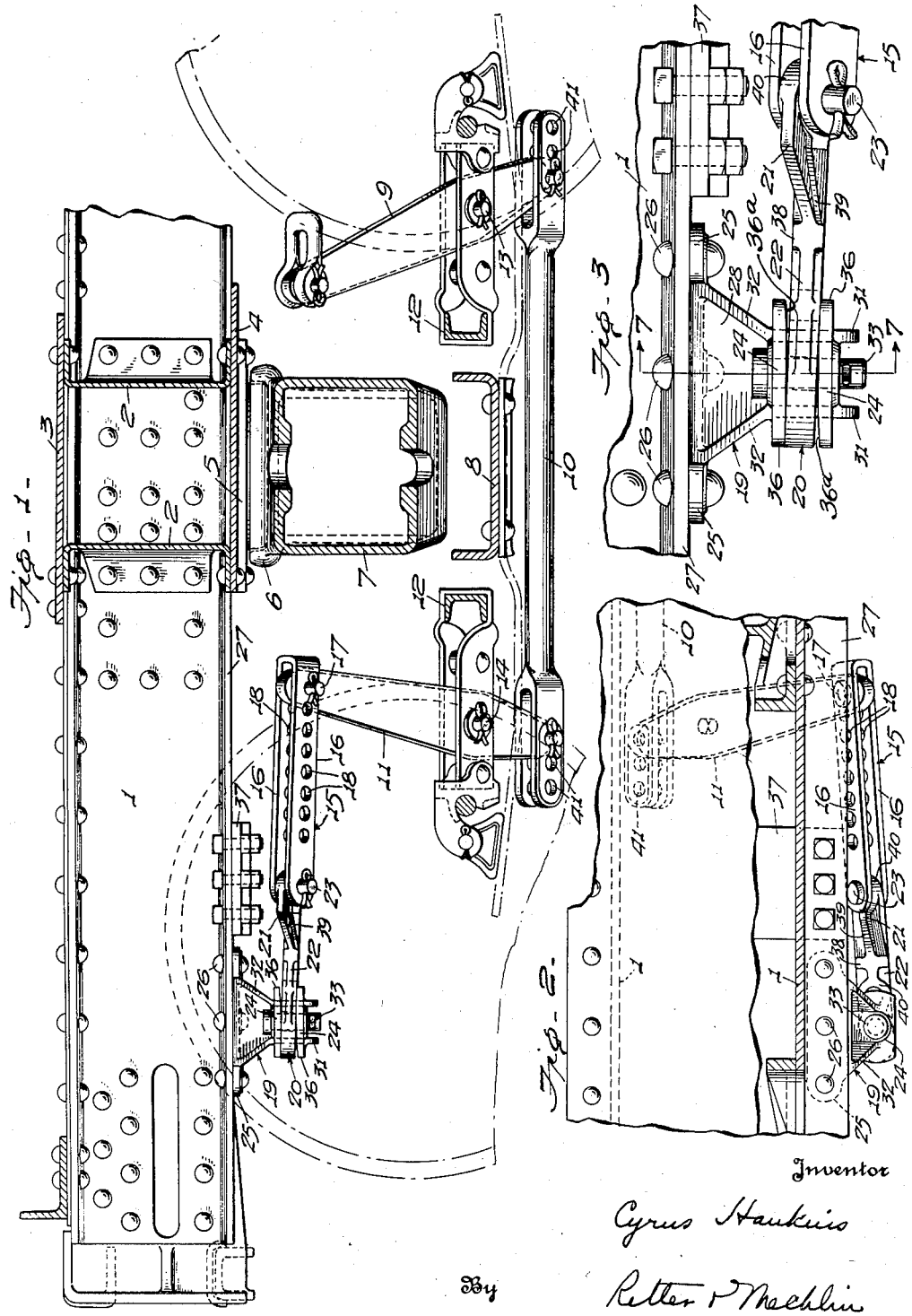

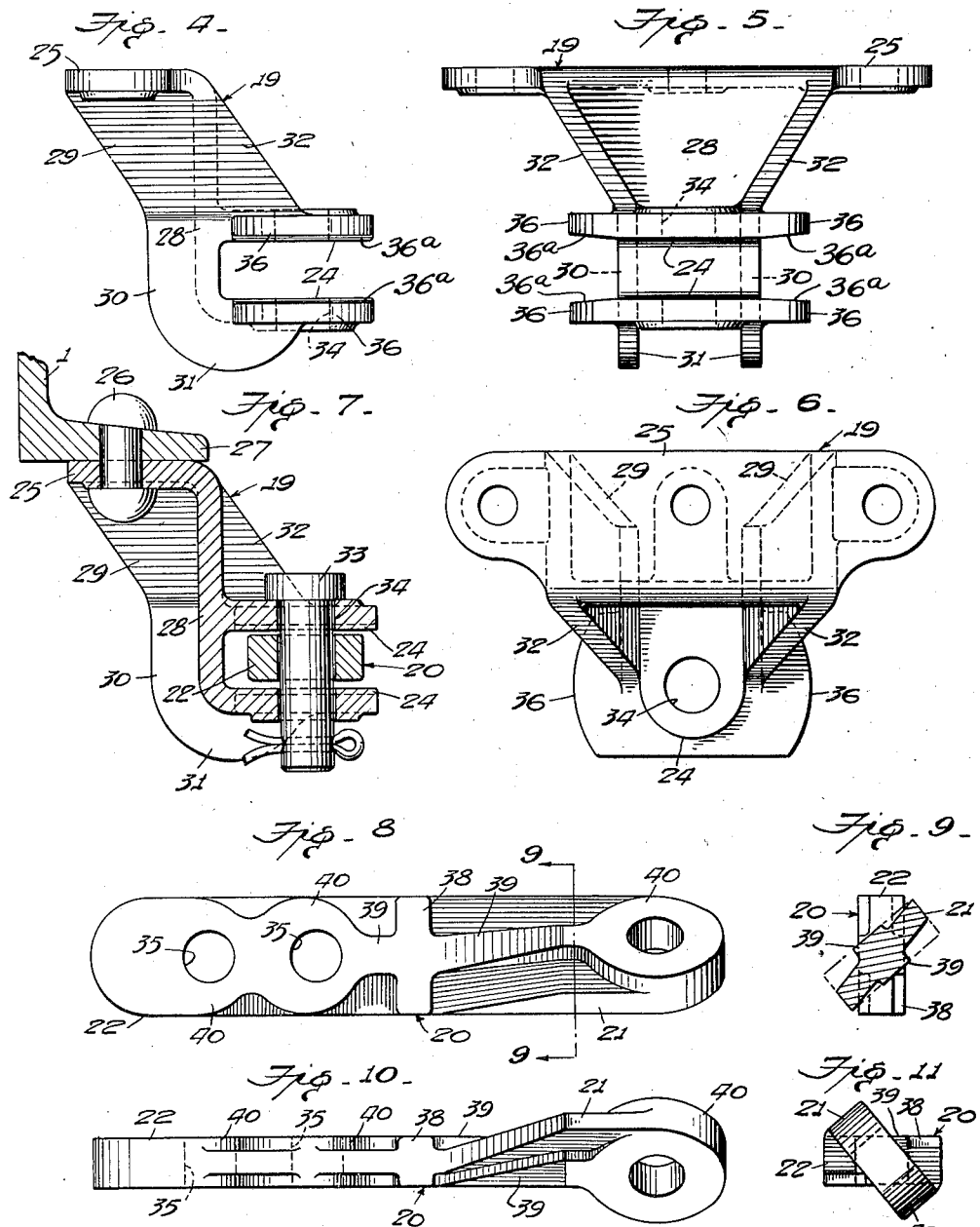

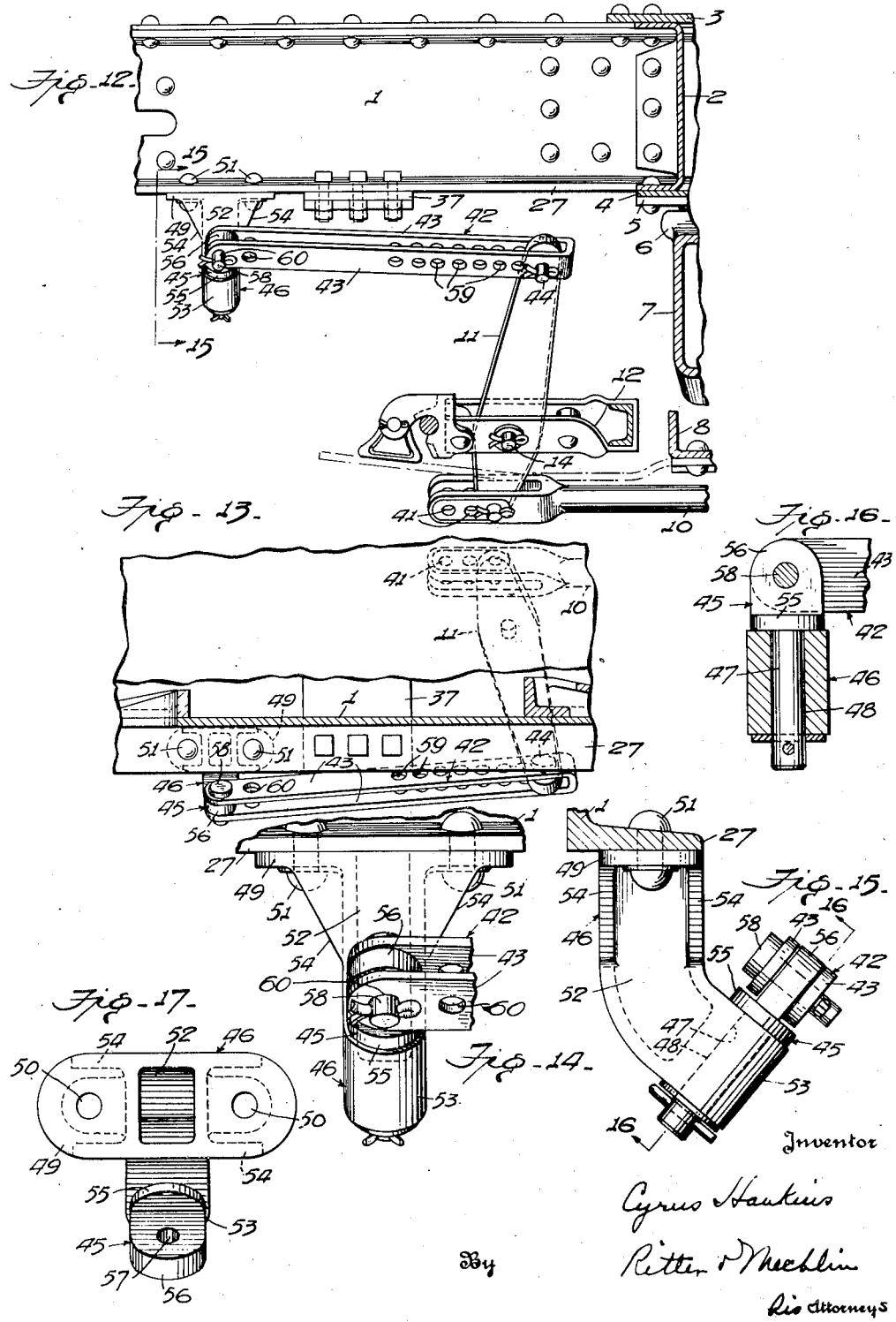

1,977,849

UNITED STATES PATENT OFFICE 1,977,849

BRAKE RIGGING FOR RAILWAY CARS

Cyrus Hankins, Washington, D. C.

Application March 11, 1931, Serial No. 521,813

24 Claims. (Cl. 188—206)

My invention relates to railway cars and more particularly to improvements in the brake rigging thereof. The conventional railway car brake consists of a fluid pressure cylinder rigidly mounted on the car underframe and a system of connected rods and levers for transmitting force from the cylinder to brake shoes which cooperate with the wheels of the car. One of the brake levers, commonly called the dead lever, is anchored to a bracket secured to some part of the car truck, usually the bolster. As the brake cylinder is rigid with the underframe of the car while the truck is movably associated therewith, the brake applying force travels from the dead lever bracket back to the underframe through the parts of the truck interposed between the bracket and underframe, namely, the bolster and center plates. As these parts of the truck are designed for certain flexibility of movement and for a predetermined load of vertical and horizontal forces their ability to function properly and to withstand the predetermined loads is greatly impaired when the brake applying forces are transmitted through them. Moreover, in addition to this unbalanced load induced in the truck parts when the brake force is transmitted through them, there is usually a torsional force of considerable magnitude set up in the truck due to the eccentricity of the point of application of the brake force and its point of reaction with respect to the pivotal center of the truck. This torsional force tends to cause the truck to rotate relatively to the underframe thereby aggravating the increased wear on the truck parts induced by the unbalanced direct force and moving the truck as a whole out of square and its parts out of alinement.

It is the object of the present invention therefore, to transmit the brake force directly from the brake rigging to the car underframe instead of through the car truck to relieve the latter of all abnormal and eccentric strains so that it will be free to function in its designed manner.

A primary feature of the invention consists in providing means for flexibly connecting the dead lever to the underframe of the car so that the lever may be free to move in substantially all directions relatively to the underframe to compensate for relative movement between the car body and car truck.

Another feature of the invention consists in providing means for connecting the upper end of the dead lever to the underframe in such manner to permit the lever to move angularly with respect to the longitudinal axis of the underframe in substantially all directions, the means involving a member pivotally mounted on the underframe and a rigid member pivotally connected at one end to the first-named member and pivotally connected at the other end to the dead lever.

Another feature of the invention consists in providing means for connecting the dead lever to the underframe involving a rigid member connected to the dead lever, a movably mounted member carried by the underframe and pivot pins for respectively connecting the rigid member to the dead lever and to the movably mounted lever.

A further feature of the invention consists in providing the underframe of the car with a movable member and in interposing between the latter and the dead lever a rigid member, pivot pins whose axes are substantially perpendicular to the plane of normal operation of the lever being employed for respectively connecting the rigid member to the lever and to the movable means.

A still further feature of the invention consists in pivotally connecting to the upper end of the dead lever a rigid member having spaced arms embracing the lever and in movably connecting the rigid member by a pivot pin to a movably mounted member carried by the car underframe.

A still further feature of the invention consists in providing two pin connected members for connecting the upper end of the dead lever to a bracket rigidly secured to the car underframe, one of said members being pivotally connected to the bracket by a substantially vertical pivot pin and the other of said members being connected to the lever by a pivot pin inclined to the vertical.

Other and more specific features of the invention residing in advantageous forms, combinations and relations of parts will hereinafter appear and be pointed out in the claims.

In the drawings illustrating preferred embodiments of the invention:

Figure 1 is fragmentary, vertical sectional view of a railway car with my invention applied thereto.

Figure 2 is a plan view partly in section of a portion of the construction illustrated in Figure 1.

Figure 3 is an enlarged side elevational view of the portion of the dead lever connecting means adjacent the end thereof secured to the car underframe.

Figure 4 is an enlarged side elevational view of the bracket secured to the car underframe.

Figure 5 is a front elevational view of the bracket.

Figure 6 is a plan view of the bracket.

Figure 7 is an enlarged sectional view taken on line 7—7, Figure 3.

Figure 8 is a plan view of one of the members of the dead lever connector.

Figure 9 is a sectional view taken on line 9—9, Figure 8.

Figure 10 is a side elevational view of the member shown in Figure 8.

Figure 11 is an end elevational view of that member.

Figure 12 is a view similar to Figure 1 illustrating a modified form of the invention.

Figure 13 is a view similar to Figure 2 illustrating the modified form of the invention.

Figure 14 is a view similar to Figure 3 of the modified form of the invention.

Figure 15 is an enlarged sectional view taken on line 15—15, Figure 12.

Figure 16 is a fragmentary sectional view taken on line 16—16, Figure 15.

Figure 17 is a plan view of the bracket of the modified form of the invention with the rotatable member mounted thereon.

Referring more particularly to the drawings 1 indicates the center sills of the car underframe and 2 the structural members of the body bolster which, as may be seen, are connected by top and bottom cover plates 3 and 4, respectively. Underlying the bottom cover plate adjacent the central portion of the body bolster is a center bearing, one plate 5 of which is secured to the body bolster and the other plate 6 of which is rigid and preferably integral with the truck bolster 7. As is well known, the truck bolster is supported by springs (not shown) which rest upon a spring plank 8.

As the invention only relates to means for connecting the brake rigging to the underframe of the car only a portion of the rigging has been illustrated, namely, the live lever 9, the bottom or push rod 10 and the dead lever 11. The live and dead levers are, as is customary, inclined to the vertical, usually at an angle of approximately 40°, and they are pivotally connected to the brake beams 12 to which brake shoes (not shown) are attached. As is known the brake force is transmitted from a fluid pressure cylinder (not shown) rigid with the car underframe to the upper end of the live lever by one or more top or pull rods (not shown). The live lever being pivotally connected by a pin 13 to the brake beam is caused to rotate in a clockwise direction as viewed in Figure 1 and thus move the bottom or push rod 10 toward the adjacent end of the car. This action causes a corresponding movement of the lower end of the dead lever 11 which is pivoted or fulcrumed as at 14 to the adjacent brake beam. As the upper end of the dead lever is anchored against movement longitudinally of the car it will be perceived that during the operation just described the brake shoes carried by the brake beams are caused to move in opposite directions into operative engagement with the wheels of the truck.

The means for attaching the upper end of the dead lever to the car underframe comprise a tension connector involving a plurality of movable connected members. In each of the illustrated forms of the invention these members are pin connected and one of them is pivotally mounted on the dead lever and the other is movably mounted on a bracket rigidly secured to the underframe.

In the form of the invention shown in Figures 1 to 11, inclusive, the member pivotally connected to the dead lever is designated by the reference numeral 15 and it is preferably of U-shape having arms 16 disposed in planes substantially parallel with the plane of normal operation of the lever. The arms 16 are spaced a sufficient distance apart to receive the upper end of the lever and are connected thereto by a pivot pin 17. In order that the arms and lever may be connected in various positions of adjustment to take up slack in the brake rigging, the arms are provided with a plurality of pairs of registering apertures 18, any pair of which is adapted to receive the pin 17. As may be observed, the pivot pin 17 is substantially perpendicular to the plane of normal operation of the lever so that the member 15 may move in a plane parallel with the latter.

The other member of the tension connector shown in the principal form of the invention, namely, the member movably carried by the bracket 19 and designated by the reference numeral 20, is formed with angularly disposed plate-like end portions 21 and 22. The plate portion 21 is adapted to be disposed in a plane substantially parallel with the plane of operation of the dead lever and it is interposed between and pivotally connected to the arms 16 of the member 15 by a pivot pin 23, the axis of the pin being perpendicular to the plane of operation of the lever and therefore parallel with the axis of pin 17. As the member 15 is pivotally connected to the dead lever and to the member 20 it will be appreciated that the dead lever is free to move up and down with respect to the underframe of the car to compensate for relative vertical movement between the latter and the car truck.

The plate-like end portion 22 of the member 20 is adapted to be disposed in a substantially horizontal plane between vertically spaced jaws 24 with which the bracket 19 is provided. This bracket is preferably formed with a substantially horizontal top flange or plate portion 25 rigidly secured by rivets 26 to the underside of the bottom flange 27 of the adjacent center sill 1. Extending downwardly from the top flange 25 is a substantially vertical web or plate portion 28 with which the jaws 24 are preferably integrally formed. The bracket may be conveniently reinforced by providing the marginal edges of the plate portion 28 thereof with inwardly extending flanges, the upper portions 29 of which converge downwardly to adjacent the upper one of the jaws 24 while the lower portions 30 of which are substantially parallel and extend for a short distance, as at 31, beneath the lower jaw to rigidify the latter. The upper jaw may advantageously be rigidified by flanges 32 which converge downwardly from adjacent the top flange 25 and constitute continuations of the reinforcing flanges 29. The combined width of flanges 29 and 32 is preferably the same as the width of the top flange 25 and their side marginal edges preferably incline downwardly and outwardly from the corresponding edges of the flange 25.

The plate-like portion 22 of the member 20 is connected to the jaws 24 by a substantially vertical pivot pin 33 which extends through registering apertures 34 in the jaws and a suitably formed aperture 35 in the member 20. The jaws 24 are provided with projecting shelf-like portions 36, the inner surfaces of which are inclined slightly, as at 36a, to engage relatively large areas of the member 20 and thereby afford extended bearing areas for the latter. By connecting the member 20 to the bracket by a substantially vertical pivot pin it will, of course, be appreciated that the tension connector as a whole and consequently the dead lever is free to move horizontally with respect to the underframe to compensate for relative rotation between the latter and the car truck. It is to be noted that the jaws of the bracket are spaced a sufficient distance below the center sills of the car so that the connector when moved horizontally by the dead lever will clear any attachments or appurtenances mounted on the sills such as a draft gear supporting member 37. Moreover, the jaws of the bracket are disposed laterally of the center sill so that the connecting pin 33 is easily accessible for the purpose of making repairs and adjustments. Furthermore, by positioning the jaws in this manner it will be perceived that an increased clearance is provided between the underframe and connector as the major portion of the latter when in normal position is not disposed beneath the center sill but instead is disposed to one side thereof. Thus the outer end of the connector, that is, the end adjacent the bracket is disposed a greater distance from the longitudinal center line of the car than the opposite or inner end thereof. It is also to be noted that since the jaws open laterally, the bracket is reversible in that it may be mounted on either side of the center sills, thus making "rights" and "lefts" unnecessary.

The member 20 may be conveniently reinforced by transversely and longitudinally extending ribs 38 and 39, the latter merging with and connecting bosses 40 which may advantageously be formed around the apertured portions of the member. Instead of forming the portion 22 of the member with only one aperture for receiving the vertical pivot pin 33 it is preferably formed with two apertures either one of which is adapted to receive the pin so that the member may be pivotally connected to the bracket in different positions of adjustment. The distance between the centers of these apertures is greater than the distance between the centers of the apertures at the inner end of the member connected to the dead lever. By forming the apertures in one end of the tension connector a greater distance apart than the apertures in the other end it will be readily perceived that a very fine degree of adjustment may be obtained in taking up whatever slack may occur in the brake rigging. Furthermore, the push rod 10 may be also provided with a plurality of pin receiving apertures 41 whereby it may be connected in various positions of adjustment to the dead lever and live lever to assist in taking up slack.

By providing flexible means such as the two part tension connector illustrated in the drawings for connecting the dead lever to the underframe it will be appreciated that the lever is free to move angularly with respect to the longitudinal axis of the car in substantially all directions to compensate for all relative movement between the car body or underframe and the car truck. The vertical pivot pin 33 permits the lever to move horizontally of the car while the inclined pins 17 and 23 which are substantially normal to the plane of operation of the lever permit it to move up and down. It is to be noted that the thickness of the portion 22 of the member 20 is slightly less than the distance between the jaws 24 so that the former may move up and down a very limited degree. This limited movement of the member will take care of the normal up and down movement of the dead lever when the brakes are set but an abnormal movement of the lever under these conditions will be taken care of by angular displacement of the members 15 and 20. It is this angular displacement of the members which also takes care of up and down movement of the lever when the brakes are not set.

In the form of the invention illustrated in Figures 12 to 17, inclusive, the tension connector comprises a member 42 having spaced arms 43 similar to those of member 20 shown in the principal form of the invention. As in that form the arms 43 are substantially parallel to the plane of normal operation of the dead lever and are spaced a sufficient distance apart to receive the upper end of the latter for pivotal connection thereto by a pin 44. The other member of the connector, designated by the reference numeral 45, is rotatably mounted on a bracket 46 and is rigidly provided with a portion 47 journaled in a recessed or apertured portion 48 of the bracket.

The bracket 46 has a top flange or plate portion 49 formed with apertures 50 for receiving rivets 51 by which it may be attached to the underside of the bottom flange of the adjacent center sill. Depending from the top flange is a box-like portion 52 which terminates in an outwardly and downwardly inclined portion 53 in which the aperture of recess 48 is formed. The flange 49 may be advantageously reinforced by substantially vertical gusset-like flanges 54. The upper end of the box portion of the bracket is preferably open so that the bracket may conveniently be formed as an integral casting.

The axis of rotation of the member 45 is preferably disposed in a plane parallel with the plane of normal operation of the dead lever and the member may advantageously be formed with a laterally projecting supporting portion or flange 55 adapted to be disposed in overlapping engagement with portions of the bracket adjacent the aperture 48 thereof. Projecting upwardly from the flange 55 is a lug or the like 56 provided with an aperture 57 for receiving a pin 58 to pivotally connect the two members of the connector. The axis of this pin is substantially parallel with the axis of pin 44 and substantially perpendicular to the axis of rotation of member 45. In order that any slack in the brake rigging may be quickly and conveniently taken up, member 42 of the connector is provided with two sets of pin receiving apertures, one set, designated 59, being adapted to receive pin 44 and the other, designated 60, being adapted to receive pin 58. The distance between the centers of the apertures of set 59 is less than the distance between the apertures of set 60 so that a very fine degree of adjustment may be obtained.

From the foregoing it will be perceived that the means illustrated in the modified form of the invention, as well as in the preferred form, for connecting the upper end of the dead lever to the underframe is of such construction that the lever is capable of substantially universal movement with respect to the underframe to compensate for relative movement between the car body and car truck.

I claim:

1. In a railway car brake rigging, the combination with the underframe of a car and a truck swiveled thereto, of an inclined dead lever carried by the truck, a bracket rigid with the underframe, a movably mounted member carried by the bracket, rigid means interposed between the movably mounted member and the upper end of the dead lever, and pivot pins for respectively connecting one end of the rigid means to the brake lever and the other end thereof to the movably mounted member, the axes of said pins being respectively disposed in substantially parallel planes.

2. In a railway car brake rigging, the combination with the underframe of a car and a truck swiveled thereto, of an inclined dead lever carried by the truck, a bracket rigid with the underframe, movable means carried by said bracket, a rigid member interposed between the upper end of the dead lever and said movable means, pivot pins for respectively connecting said rigid member to the lever and to said movable means, the axes of said pins being respectively substantially perpendicular to said lever.

3. In a railway car brake rigging, the combination with the underframe of a car and a truck swiveled thereto, of an inclined dead lever carried by the truck, a bracket rigid with the underframe, and means connecting the upper end of the dead lever to the bracket, said means being adapted to compensate for relative movement between the underframe and truck and involving a rigid member having spaced arms embracing the upper end of the dead lever, a pivot pin connecting the arms and lever, a movably mounted member carried by the bracket having a portion interposed between said arms, and a pin connecting the said portion of the movably mounted member and said arms, said last-named pin being substantially normal to the lever and serving as a pivot permitting angular movement between said rigid member and the movably mounted member.

4. In a railway car brake rigging, the combination with the underframe of a car, of an inclined dead lever, a bracket rigid with the underframe, and means for connecting the upper end of the dead lever to the bracket to permit the lever to move angularly with respect to the longitudinal axis of the underframe in substantially all directions, said means involving two relatively movable pin connected members, one of said members being movably connected to the dead lever for movement in a plane substantially parallel with the plane of the latter and the other of said members being movably mounted on the bracket for movement in a plane forming an angle with said plane of the lever.

5. In a railway car brake rigging, the combination with the underframe of a car, of a dead lever, a bracket rigid with the underframe, and means for connecting the upper end of the dead lever to the bracket to permit the lever to move angularly with respect to the longitudinal axis of the underframe in substantially all directions, said means involving two relatively movable rigid members, a pivot pin for connecting one of said members to the bracket, a pivot pin for connecting the other of said members to the dead lever, and a pivot pin for connecting said members to each other, the pivotal axis of one of said pins being substantially vertical and the pivotal axis of each of the other of said pins being inclined with respect to the vertical.

6. In a railway car brake rigging, the combination with the underframe of a car, of a dead lever, and means for connecting the upper end of the dead lever to the car underframe involving two pin connected relatively movable members, a substantially vertical pin for pivotally connecting one of said members to the car underframe, and a pin inclined to the vertical for pivotally connecting the other of said members to the lever.

7. In a railway car brake rigging, the combination with the underframe of a car and a truck swiveled thereto, of an inclined dead lever carried by the truck, and means for connecting the upper end of the dead lever to the car underframe, said means being adapted to compensate for relative movement between the underframe and the truck and involving two pivotally connected members, one of said members being movable independently of the other of said members in a plane substantially parallel to the plane of the dead lever and both of said members being movable with said lever in a plane forming an angle with said plane of the lever.

8. In a railway car brake rigging, the combination with the underframe of a car, of an inclined dead lever, a bracket rigidly secured to the underframe, a horizontally movable member pivotally connected to said bracket, a member pivotally connected to the upper end of said lever, and means pivotally connecting said members adapted to permit the member secured to the lever to move independently of the other member in a plane substantially parallel with the plane of the dead lever.

9. In a railway car brake rigging, the combination with the underframe of a car and a truck swiveled thereto, of a dead lever carried by the truck, a bracket rigid with the underframe and provided with vertically spaced portions, and relatively movable members connecting the upper end of the dead lever to the bracket adapted to permit relative movement between the dead lever and underframe, one of said members having a plate-like portion interposed between and pivotally connected to the said spaced portions of the bracket, the latter being provided with shelf portions for supporting the said plate-like portion.

10. In a railway car brake rigging, the combination with the underframe of a car, of a dead lever, a bracket rigid with the underframe and provided with vertically spaced jaws, and relatively movable members for connecting the upper end of the dead lever to the bracket, one of said members having a plate-like portion interposed between and pivotally connected to the jaws of the bracket, each of said jaws being provided with a laterally projecting shelf portion provided on its inner face with an inclined portion for supportingly cooperating with the said plate-like portion.

11. In a railway car brake rigging, the combination with the underframe of a car, of a dead lever, a bracket rigid with the underframe, and means for connecting the upper end of the dead lever to the bracket to permit the lever to move angularly with respect to the longitudinal axis of the underframe in substantially all directions, said means involving a plurality of relatively movable members, one of said members being twisted intermediate its ends to provide angularly disposed end portions.

12. In a railway car brake rigging, the combination with the underframe of a car, of a dead lever, a bracket rigid with the underframe, and means for connecting the upper end of the dead lever to the bracket to permit the lever to move angularly with respect to the longitudinal axis of the underframe in substantially all directions, said means involving a member movably mounted on the bracket and a member pivotally connected at one end to the first-named member and pivotally connected at the other end to the dead lever, one of said members being twisted intermediate its end to provide angularly disposed end portions.

13. In a railway car brake rigging, the combination with the underframe of a car, of a dead lever, a bracket rigid with the underframe, and means for connecting the upper end of the dead lever to the bracket to permit the lever to move angularly with respect to the longitudinal axis of the underframe in substantially all directions, said means involving a plurality of pin connected members, one of said members having plate-like portions, one of said plate-like portions being disposed in a plane substantially parallel with the plane of normal operation of the lever and the other of said plate-like portions being disposed in a plane forming an angle with the said plane of operation of the lever.

14. In a railway car brake rigging, the combination with the underframe of a car, of a dead lever, a bracket rigid with the underframe, and means for connecting the upper end of the dead lever to the bracket to permit the lever to move angularly with respect to the longitudinal axis of the underframe in substantially all directions, said means involving a movably mounted member carried by the bracket and a rigid member pivotally connected at one end to the movably mounted member and pivotally connected at the other end to the dead lever, said movably mounted member being provided with plate-like end portions, one of said end portions being connected to the rigid member and disposed in a plane substantially parallel with the plane of normal operation of the lever and the other of said end portions being connected to the bracket and disposed in substantially a horizontal plane.

15. In a railway car brake rigging the combination with the underframe of a car, of a dead lever, means for connecting the upper end of the dead lever to the car underframe involving a plurality of rigid members respectively pivotally secured to the lever and the underframe, one of said members being provided with a plurality of apertures whereby it may be secured to the underframe in a plurality of positions of adjustment and the other of said members being provided with a plurality of apertures whereby it may be secured to the dead lever in a plurality of positions of adjustment, the axes of the apertures in one of said members being disposed at an angle to the axes of the apertures in the other of said members.

16. In a railway car brake rigging, the combination with the underframe of a car, of a dead lever, means for connecting the upper end of the dead lever to the underframe involving a plurality of members, a pivot pin for securing one of said members to the underframe, a pivot pin for securing the other of said members to the lever, said members being provided with a plurality of pin receiving apertures whereby they may be respectively secured in different positions of adjustment to the dead lever and to the underframe, the member secured to the dead lever being provided with a greater number of apertures than the member secured to the underframe.

17. In a railway car brake rigging, the combination with the underframe of a car, of a dead lever, a connector involving a plurality of members for joining the upper end of the dead lever to the car underframe, pivot pins for respectively connecting one member to the underframe and the other member to the lever, one of said members being provided with a plurality of pin receiving apertures whereby it may be secured to the underframe in different positions of adjustment and the other of said members being likewise formed with a plurality of pin receiving apertures whereby it may be secured in different positions of adjustment to the dead lever, the distance between the centers of the apertures in one of said members being greater than the distance between the centers of the apertures in the other of said members.

18. In a railway car brake rigging, the combination with the underframe of a car and a truck swiveled thereto, of an inclined dead lever carried by the truck, a bracket rigid with the underframe, a rotatable member rigidly provided with a portion journaled in the bracket, a rigid member interposed between said rotatable member and the upper end of the dead lever, said rigid member having portions respectively overlapping opposite faces of the rotatable member and lever, and pivot pins for respectively connecting said rigid member to the rotatable member and lever, the axes of said pivot pins being respectively disposed in substantially parallel planes.

19. In a railway car brake rigging, the combination with the underframe of a car and a truck swiveled thereto, of an inclined dead lever carried by the truck, a bracket rigid with the underframe, and means connecting the upper end of the dead lever to the bracket adapted to permit movement of the lever in substantially all directions with respect to the longitudinal axis of the underframe to compensate for relative movement between the underframe and truck, a rotatable member rigidly provided with a portion journaled in said bracket, a rigid member having spaced arms, the upper end of the dead lever being interposed between the arms and pivotally connected thereto, and a pin for pivotally connecting said arms to the rotatable member, the axis of said pin being substantially normal to the dead lever.

20. In a railway car brake rigging, the combination with the underframe of a car, of a dead lever, a bracket rigid with the underframe and provided with a recessed portion, a member rotatably mounted in said recess and having a laterally projecting portion disposed in overlapping engagement with portions of the bracket adjacent the recess, and rigid means pivotally connected at one end to the dead lever and at the other end to said member.

21. In a railway car brake rigging, the combination with the underframe of a car, of an inclined dead lever, a bracket rigid with the underframe, a pivotally mounted member carried by the bracket, rigid means pivotally connected at one end to the dead lever and at the other end to said member, the pivotal axis of said member being disposed in a plane substantially parallel with the plane of the lever.

22. In a railway car brake rigging, the combination with the center sill of a car and a truck swiveled thereto, the center sill being provided with a substantially horizontal bottom flange, of a dead lever carried by the truck, a bracket rigidly secured to said flange and provided with a depending portion of substantially box-shape in cross-section, a member pivotally mounted on said depending portion of the bracket, and rigid means pivotally connected at one end to the dead lever and at the other end to said member.

23. In a railway car brake rigging, the combination with the center sill of a car and a truck swiveled thereto, the center sill being provided with a substantially horizontal bottom flange, of a dead lever carried by the truck, a bracket rigidly secured to said flange and provided with a depending portion of substantially box-shape in cross section, said depending portion terminating in a laterally projecting portion provided with a recess, a member rotatably mounted in said recess, and rigid means pivotally connected to the upper end of the dead lever and to said rotatable member.

24. In a railway car brake rigging, the combination with the underframe of a car, of a dead lever, a bracket rigidly secured to the underframe, a rotatable member provided with a portion journaled in said bracket, a rigid member interposed between the rotatable member and the upper end of the dead lever, and pivot pins for respectively connecting the rigid member to the rotatable member and lever, said rigid member being provided with two sets of pin receiving apertures whereby the lever and rotatable member may be connected to the rigid member in a plurality of different positions of adjustment.

CYRUS HANKINS.